H. G. WELCH.
METHOD OF MANUFACTURING REINFORCED INNER TUBES OF PNEUMATIC TIRES AND MANDRELS THEREFOR.
APPLICATION FILED FEB. 14, 1917.
1,237,131. Patented Aug. 14, 1917.
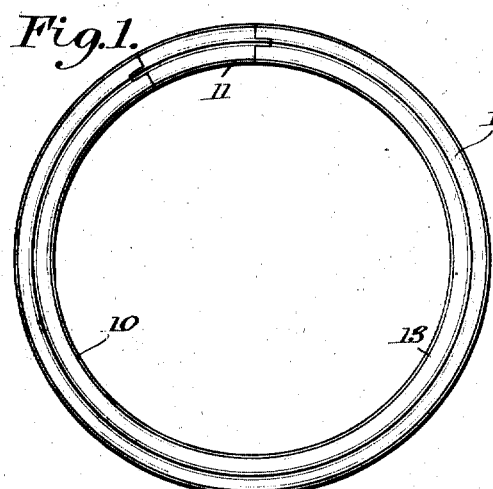
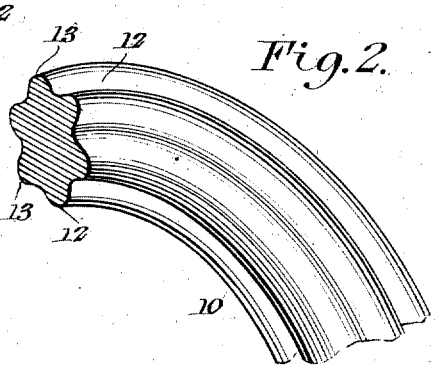
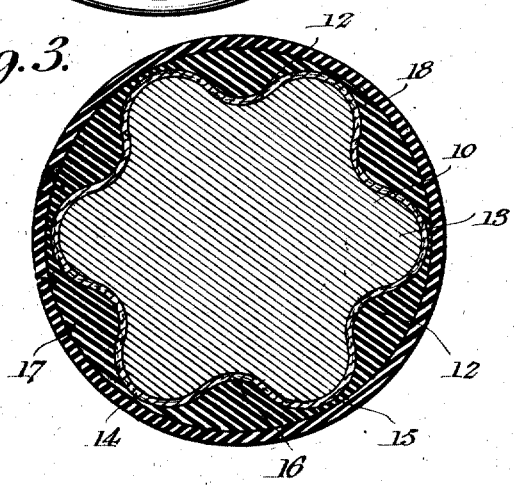
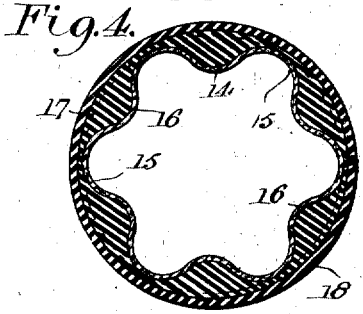
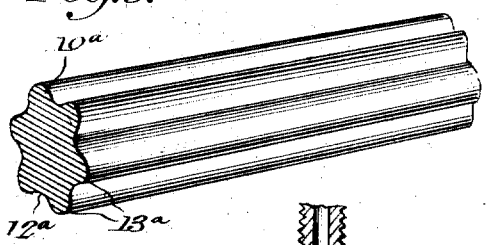
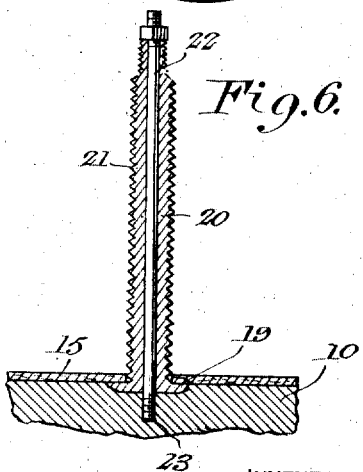
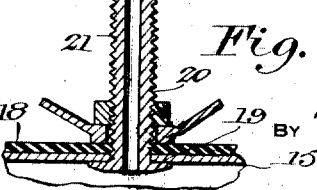
WITNESSES
Frederick W. Ely
INVENTOR
Homer G. Welch.
BY Victor J. Evans
ATTORNEY

UNITED STATES PATENT OFFICE.

HOMER G. WELCH, OF PHILADELPHIA, PENNSYLVANIA.

METHOD OF MANUFACTURING REINFORCED INNER TUBES OF PNEUMATIC TIRES AND MANDRELS THEREFOR.

1,237,131.  Specification of Letters Patent.  Patented Aug. 14, 1917.

Application filed February 14, 1917. Serial No. 148,661.

*To all whom it may concern:*

Be it known that I, HOMER G. WELCH, a citizen of the United States, residing at 809 Finance Bldg., Philadelphia, in the county of Philadelphia and State of Pennsylvania, have invented new and useful Improvements in Methods of Manufacturing Reinforced Inner Tubes of Pneumatic Tires and Mandrels Therefor, of which the following is a specification.

The invention relates to tubes and tires, such as are generally used on vehicles, as automobiles and the like, comprehending primarily an inner tube for pneumatic tires, and embodying among other objects an inner tube and the making thereof, which will present an article capable of inflation, and having instantaneous self-mending qualities sufficient to automatically close or heal punctures in its envelop, preventing the escape of the confined air; constructed to conform to the character of tires generally used in connection with pneumatic tubes and by virtue of its own construction formed to insure a tube of lasting durability and strength, to withstand rupture after inflation when subjected to the forces and pressures occasioned by the use for which it is intended.

Still further, the invention comprehends an inner pneumatic tube for tires, which is of simple formation, and has its component parts, in the making of the tube, so arranged and related that in the finished article there will be presented a nitary structure or homogeneous construction in which the very adaptation of the structures and compositions used to form the article, and the method employed in the formation, will bring about a construction resisting the usual wear, and affording self-mending or healing qualities, the usual valve mechanism employed being also so related to the tube proper that the tendency of weakness at the joint or connection of the valve mechanism with the tube, will be overcome, and less operations incurred in the assembling and connection of the valve mechanism with the tube.

It is well known that in the manufacture of reinforced inner tubes for pneumatic tires, there is employed the usual mandrel which may be either straight or annular, and over and around which various layers of uncured or cured rubber and fabric structure are disposed to provide a tubular construction which when subsequently subjected to vulcanization, will bring about a finished article capable of being inflated after removal from the mandrel, and which will provide and form the cushioning effect necessary to pneumatic tires. In these known constructions, however, the relative arrangement of the layers of fabric and rubber does not of necessity, when the article is finished, provide strong and durable tubes, devoid of weak portions or spots, and embodying puncture-healing qualities, nor does it provide for a tube that will insure uniform inflation, these defects being not only due to the manner of making the tube and the material employed, or the relative arrangement of the materials employed, but to the peculiar qualities of rubber, and which if not adapted to conform to certain constructions, will not render its best qualities to the desired end, namely, the provision of a tube that can be inflated, and will withstand the wear and tear, and other peculiar conditions to which tubes for tires are subjected.

With this in mind, I aim to provide a tube which is formed on a peculiarly constructed mandrel, that may be either straight or circumferential, and which will result in the disposition of fabric, a plastic rubber like composition, and a covering or additional layer of rubber, in which the construction of the mandrel and the formation and arrangement of the parts composing the tube, will result, when the finished tube is subsequently inflated, in a substantially uniform distribution of the plastic rubber like composition between the fabric layer and the layer of rubber, so that the insertion of a nail or other puncture-producing implement, will cause the plastic composition to heal the opening made, and prevent the air contained in the tube from passing outwardly therethrough.

In the further disclosure of the invention, reference is to be had to the accompanying drawings, constituting a part of this specification, in which similar characters of reference denote corresponding parts in all the views, and in which—

Figure 1 is an elevation of the circumferential or annular mandrel.

Fig. 2 is a fragmentary perspective view of the mandrel showing a portion thereof.

Fig. 3 is an enlarged sectional view taken through the mandrel showing the manner of forming the tube thereon.

Fig. 4 is a sectional view taken through the tube removed from the mandrel, the dotted lines indicating the appearance when inflated.

Fig. 5 is a fragmentary perspective view showing a portion of the straight mandrel.

Fig. 6 is a fragmentary sectional view taken through the mandrel and the valve to be employed with the tube, showing the manner of holding the valve in position upon the mandrel while the tube is being formed, and Fig. 7 is a fragmentary sectional view taken through the valve showing the same in position on the tube, after the same has been removed from the mandrel.

Referring more particularly to the views, I provide a mandrel 10 of an annular or circumferential shape, and having a removable section 11 which can be suitably associated with the body of the mandrel to form a continuous construction, the section being provided for the purpose of facilitating the removal of the finished tube, after the same has been formed upon the mandrel. Referring carefully to Figs. 2 and 3, it will be seen that the mandrel is formed with longitudinal or circumferentially arranged channels or grooves 12, so that the entire periphery of the mandrel is of corrugated effect, the formation of the grooves naturally providing longitudinal circumferential ribs 13 between adjacent grooves or channels, and referring to Figs. 2 and 3 it will be noted that the entire surface of the mandrel, as well as its associated section 11, have the grooves or channels formed therein. In Fig. 5 there is disclosed a straight mandrel 10ª having grooves or channels 12ª, and of course ribs 13ª similar to the ribs 13, the only difference in construction being that the mandrel shown in Figs. 1–2 and 3 is annular in shape; whereas, the mandrel shown in Fig. 5 is straight, in the nature of a bar, it being understood that the formation of the tube on either of the mandrels is substantially the same, except in the removal thereof when the tube is finished.

After the section 11 has been arranged upon the mandrel 10 in the annular form of mandrel, a layer of fabric 14 is wrapped around the mandrel and is pressed into the grooves or channels 12, the layer of fabric when applied to the mandrel conforming to the shape thereof in every particular, with the fabric following the periphery of the mandrel in the grooves or channels and covering the ribs 13. It will of course be understood that in a similar manner the fabric is wrapped around the straight mandrel, shown in Fig. 5, so that it will conform to the peripheral formation thereof, thus providing plaits 15, and result in an undulated construction, the fabric also forming grooves or channels 16 in the grooves or channels 12.

After the fabric has been wrapped around the mandrel, the fabric is covered with a quantity of what might be termed, plastic rubber composition, indicated by the numeral 17, and this plastic rubber is disposed to fill up the grooves or channels 16 in the fabric, and also cover the plates 15, so that the surface of the applied coat or layer of plastic rubber composition will be substantially circular in cross section. A covering or layer of rubber 18 is then wrapped around, or applied to the already formed body of the tube, as shown in Fig. 3, said layer of rubber being also circular in cross section, and uniformly wrapped around to entirely inclose the plastic rubber composition, so that the plastic rubber composition will lie between the fabric layer and the outer layer or covering of rubber, it being readily seen that there will be more of the plastic rubber between the groove or channel portions of the fabric and the outer layer of rubber, than between the ribbed portions of the fabric or the plaits 15 and the outer layer of rubber.

The assembled elements are now subjected to vulcanization in the usual or any preferred manner, and it will be seen that the same will become a homogeneous or unitary construction, so that when the tube is subsequently removed from the mandrel, either by sliding it off of the straight mandrel, or by slitting the tube and removing the section 11 of the circumferential mandrel, and then sliding off the tube, the said tube will consist of an inner fabric construction, and an outer rubber construction, with an interposed plastic rubber formation, or vice versa, in the event the tube is reversed to have the fabric layer on the outside and the layer of rubber on the inside.

Prior to the application of the fabric, the plastic rubber composition and the covering of rubber to the mandrel, however, the inner head end 19 of a valve 20 including a tubular stem 21, is arranged in one of the grooves or channels 12 of the mandrel, and a stem or rod 22 is inserted through the tubular portion of the valve stem, and has its one end threaded into a suitable opening 23 in the mandrel, thus holding the valve rigidly in position upon the mandrel. The fabric is then applied to the mandrel as described heretofore, and will surround the inner end of the stem, as will also the plastic rubber composition and the covering of rubber, and when these parts are subsequently subjected to vulcanization, it will be seen that the head end of the valve and the inner end of the stem will also become a part of the inner tube, and appear to be integral therewith. The rod 22, after the vulcanization process is completed, is removed from the mandrel and the tube can then be slid off with the valve as a component part thereof, thus obviating the necessity of separately attaching, patching and vulcanizing the valve to the tube, as is now usually done, the tube with the valve applied thereto in the manner mentioned being clearly shown in Fig. 7.

From the foregoing description it will be seen that in short the peculiarly constructed mandrel having a corrugated periphery is first subjected to the wrapping of fabric or rubberized fabric in such manner as to cause the fabric to follow the contour of the corrugations of the mandrel, after which the plastic rubber composition is applied to the fabric, filling up the corrugations and the whole then wrapped with rubber tube stock and vulcanized into a homogeneous construction, this being followed out with or without the particular valve application disclosed herein.

Referring to Fig. 4 it will be seen that when the finished tube is subjected to an air pressure by inflation, the fabric will tend to distend into a uniform circular construction, causing the thickened portions of plastic rubber to uniformly even out as between the layer of fabric and the outer covering of rubber, and thus provide a construction which, when a puncture-producing implement is inserted or projected into the tube, will result in the plastic rubber composition filling up the opening or hole produced, so as to prevent the leakage or outflow of air contained in the tube, the said interposed layer or portion of live and movable plastic composition also greatly adding to the strength of the completed tube and its cushioning effect when the tube is in use, while at the same time the interposed plastic rubber composition will on account of the vulcanizing process, securely bind the fabric and rubber coverings or layers to each other, whether the rubber layer is on the outside and the fabric on the inside, as shown, or whether the fabric is on the outside and the rubber on the inside, as might be accomplished by simply reversing or turning inside out the completed tube.

From the foregoing it will be seen that in a tube of the character described, there is provided a construction of simple formation, embodying a minimum amount of material, and by which there is provided a tube that in use, and when associated with the usual shoe or tire, will be sufficiently blow-out proof and of self-healing or mending qualities, due to the provision of the plastic composition rubber. The latter is of extreme importance in that the tube, by reason of its formation, will be absolutely pinch-proof; that is to say, in the application of the tube to a tire and the mounting of the same upon the felly of a wheel, the tube will not be pinched as is ofttimes the case with present tubes now generally used, and which when pinched are weakened to an extent which causes blow-outs to occur. Further, a tube of the character mentioned will be less liable to be rim-cut than the ordinary tubes now generally used due also to the formation of the tube and the use of the plastic composition rubber, related as it is to the inner and outer coverings set forth herein.

Having described my invention, I claim—

1. A mandrel for making tubes comprising an annular body, substantially circular in cross section and formed to provide ridges and hollows, said ridges and hollows extending circumferentially of said annular body.

2. A mandrel for making tubes comprising a circular body on which the tube is wrapped, a removable section or sections for said body and normally forming a part thereof, said section or sections permitting the removal of the completed tube, and channels formed in said body and sections and extending circumferentially of said mandrel.

3. A mandrel comprising a body for the formation of the tube thereon, and having one or more channels extending circumferentially thereof, and means associated with said body for the positioning of the valve in the tube when the tube is formed on the body.

4. The herein described method for making inner tubes for tires, consisting in providing a mandrel formed with one or more channels, seating the inner end of a valve stem on the mandrel, holding the stem and the mandrel, winding the wrapping around the valve stem with portions of the wrapping extending into the grooves, covering the wrapping with a coating of plastic composition rubber, filling up the grooves of the covering formed by having the portions of the covering extending into the grooves of the mandrel, said plastic composition rubber also being placed around the valve stem, applying an outer covering over said plastic composition rubber and around said valve stem, vulcanizing the entire structure, and then disassociating the means for holding the valve stem from the mandrel and removing the completed tube from said mandrel.

In testimony whereof I affix my signature.

HOMER G. WELCH.